US012263697B1

(12) United States Patent
Arjomand et al.

(10) Patent No.: US 12,263,697 B1
(45) Date of Patent: Apr. 1, 2025

(54) ICE BRANDING/STAMPING MACHINE

(71) Applicant: 2dor Gourmet Ice LLC, Miami, FL (US)

(72) Inventors: Hamid G. Arjomand, Tenino, WA (US); James Owen, Portland, OR (US); Carlos Leal, Miami, FL (US)

(73) Assignee: 2dor Gourmet Ice LLC, Miami, FL (US)

(*) Notice: Subject to any disclaimer, the term of this patent is extended or adjusted under 35 U.S.C. 154(b) by 0 days.

(21) Appl. No.: 18/915,778

(22) Filed: Oct. 15, 2024

(51) Int. Cl.
*B44C 1/24* (2006.01)
*F25C 5/00* (2018.01)

(52) U.S. Cl.
CPC .................................... *B44C 1/24* (2013.01)

(58) Field of Classification Search
None
See application file for complete search history.

(56) References Cited

U.S. PATENT DOCUMENTS 5,431,024 A * 7/1995 Hobelsberger .......... B44C 1/225 62/1
2021/0318049 A1* 10/2021 Moczygemba ........... F25C 1/22

OTHER PUBLICATIONS

Branding Irons Unlimited, “Customizable Ice Stamping Plate,” [retrieved Sep. 27, 2024] URL: <https://brandingirons.com/products/customizable-ice-stamping-plate?variant=40288481181770&currency=USD&utm_medium=product_sync&utm_source=google&utm_content=sag_organic&utm_campaign=sag_organic&utm_source=googleads&utm_medium=sg-PMAX-03&utm_campaign=20975336625&utm_term=&gad_source=1&gclid=CjwKCAjwqMO0BhA8EiwAFTLgINgqp9P5aPboPuwb48oKQTp13qLVwXsWc11p6hQSR_WlpdJnXMv9CBoCkB4QAvD_BwE>.
Wintersmiths, “How to use an ice stamp,” [retrieved Sep. 27, 2024] URL: <https://www.wintersmiths.com/pages/how-to-use-an-ice-stamp>. 5 pages.

* cited by examiner

*Primary Examiner* — Mohammad M Ameen
(74) *Attorney, Agent, or Firm* — Stephen J. Kenny; Foley Hoag LLP

(57) ABSTRACT

A system for stamping ice includes a housing, a stamping area, a loading tray, and a pusher mechanism. The housing has an opening extending into an interior volume of the housing. The stamping area positioned within the interior volume of the housing is configured to receive an ice body. The loading tray is couple to the housing and is configured to receive a removable stamp and a heating element. The heating element is configured to maintain the stamp at a set temperature. The pusher mechanism positioned within the interior volume of the housing is configured to push the ice body against a surface of the stamp.

18 Claims, 12 Drawing Sheets

500

500

800

1100

1150

ICE BRANDING/STAMPING MACHINE

BACKGROUND OF THE DISCLOSED SUBJECT MATTER

Field of the Disclosed Subject Matter

The disclosed subject matter relates to systems and methods for branding and stamping operations. Particularly, the present disclosed subject matter is directed to automated branding and stamping of ice and ice shapes.

Description of Related Art

There is an increasing demand for ice having commercial branding and/or personal branding. This market has few tools or specialized equipment available.

Conventional methods and systems have generally been considered satisfactory for their intended purpose. However, available systems for stamping ice are typically hand-held stamps, which are not automated to handle one or more pieces of ice and often require a user to manually press a stamp into each piece of ice. Additionally, available systems lack a controlled heating system to maintain a stamp at room temperature or an elevated temperature during the stamping process, which can make the stamping process time consuming. Users often need to wait until the temperature of a stamp equilibrates to room temperature or attains the desired temperature, otherwise the stamping process may be ineffective.

When using a conventional ice stamp, some recommended that the ice surface be tempered to room temperature before pressing the stamp onto it to avoid cracking. Tempering allows the ice to warm up, so it is less likely to crack when liquid is poured on top, such as the liquid formed by or on the stamp. The stamp is typically pressed against the tempered ice surface for 10-15 seconds. Although prior art stamps are typically used at room temperature, they tend to cool during use from exposure to ice and therefore may need periodic warming (such as exposure to a warmed bath or waiting for the stamp to warm to ambient/room temperature).

Therefore, there remains a need for improve and efficient systems and method for branding and stamping ice.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a system for stamping ice comprising a housing, a stamping area, a loading tray, and a pusher mechanism. The housing has an opening extending into an interior volume of the housing. The stamping area within the interior volume of the housing is configured to receive an ice body. The loading tray is coupled to the housing and configured to receive a removable stamp and a heating element. The heating element is configured to heat the stamp to a first temperature (which may be ambient room temperature or some other temperature that is either pre-set or selected); accordingly the ice body need not be tempered (although it could as one of skill in the art would appreciate). The pusher mechanism within the interior volume of the housing is configured to push the ice body against a first surface of the stamp.

The pusher mechanism can push the ice body laterally. The ice body can be an ice cube. The loading tray can be disposed on a side of the housing. The loading tray can include at least one spring coupled to the heating element. The at least one spring can bias the heating element against the removable stamp. The system can further comprise a control panel for monitoring and controlling operation of the system. The control panel can comprise indicators configured to produce a signal when the stamp is at or heated to the first temperature. The system can further comprise a dispensing area. The ice body within the stamping area can be transferred to the dispensing area after a period of time.

The system can further comprise an ejection mechanism configured to eject the ice body from the stamping area. The ejection mechanism can comprise a drive gear, a follower gear, a spring element, and an ejection member. The drive gear can be circumscribingly fixed to a first shaft. The first shaft can be configured to rotate about a longitudinal axis of the first shaft. The follower gear can be circumscribingly coupled to a second shaft. The second shaft can be configured to rotate about a longitudinal axis of the second shaft. The follower gear can be configured to mesh with the drive gear. The longitudinal axis of the first shaft can be parallel to the longitudinal axis of the second shaft. The spring element can have a first end and a second end. The first end can be coupled to the first shaft and the second end can be coupled to the second shaft. The ejection member can be coupled to a third shaft having a longitudinal axis parallel with the longitudinal axis of the first shaft and the second shaft. The first end of the third shaft can be coupled to the follower gear such that a rotation of the follower gear rotates the ejection member about the longitudinal axis of the third shaft. A rotation of the drive gear can responsively rotate the follower gear and the ejection member such that the ejection member rotates from a first position to a second position, wherein in the second position a portion of the ejection member applies a pushing force to the ice body in the stamping area. The ejection member can be generally L-shaped.

The pusher mechanism can comprise a cam shaft, a cam, and a follower. The shaft can be rotatably mounted and driven by an actuator. The cam can be coupled to the cam shaft. The follower can contact an exterior surface of the cam. The exterior surface can define a predetermined motion profile for the follower when the actuator drives the cam shaft. The follower can have an advanced position such that in the advanced position the follower pushes the ice body against the first surface of the stamp.

The system can further comprise a guide member having an opening. The follower can comprise a rod member. The rod member can be slidingly coupled to the opening of the guide member. The stamp can comprise a body having a retaining feature configured to abut an interior surface of the loading tray such that a portion of the stamp extends beyond an exterior surface of the loading tray. The heating element can be configured to maintain the stamp at the first temperature. The system can further comprise a spring element having a first end and a second end. The first end can be coupled to the loading tray and the second end can be coupled to the heating element. The spring element can be biased to a stretched position. The first surface of the stamp can be parallel to a surface of the ice body. The opening extending into an interior volume of the housing can be coupled to a feed chute having an interior surface that defines a guide path for the ice body. The system can further comprise a sensor configured to detect the ice body within the stamping area. The pusher mechanism can be activated when the sensor detects the ice body within the stamping area.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

The various concepts introduce above and discussed in greater detail below may be implemented in a number of ways, as the described concepts are not limited to any particular manner embodiment.

Reference will now be made in detail to exemplary embodiments of the disclosed subject matter, examples of which are illustrated in the accompanying drawings. The method and corresponding steps of the disclosed subject matter will be described in conjunction with the detailed description of the system. Wherever possible, the same reference numbers will be used throughout the drawings to refer to the same or like parts.

References herein to positions of elements (e.g., “top”, “bottom”) are merely used to describe the orientation of various elements in the FIGURES. It should be noted that the orientation of various elements may differ according to other embodiments, and that such variation are intended to be encompassed by the present disclosure.

The term “about” means a range of values inclusive of the specified value that a person of ordinary skill in the art would reasonably consider to be comparable to the specified value. In some embodiments, “about” means within a standard deviation using measurements generally accepted by a person of ordinary skill in the art. In some embodiments, “about” means ranging up to ±10% of the specified value. In some embodiments, “about” means ranging up to ±5% of the specified value. In some embodiments, “about” mean the specified value.

Figure 1:
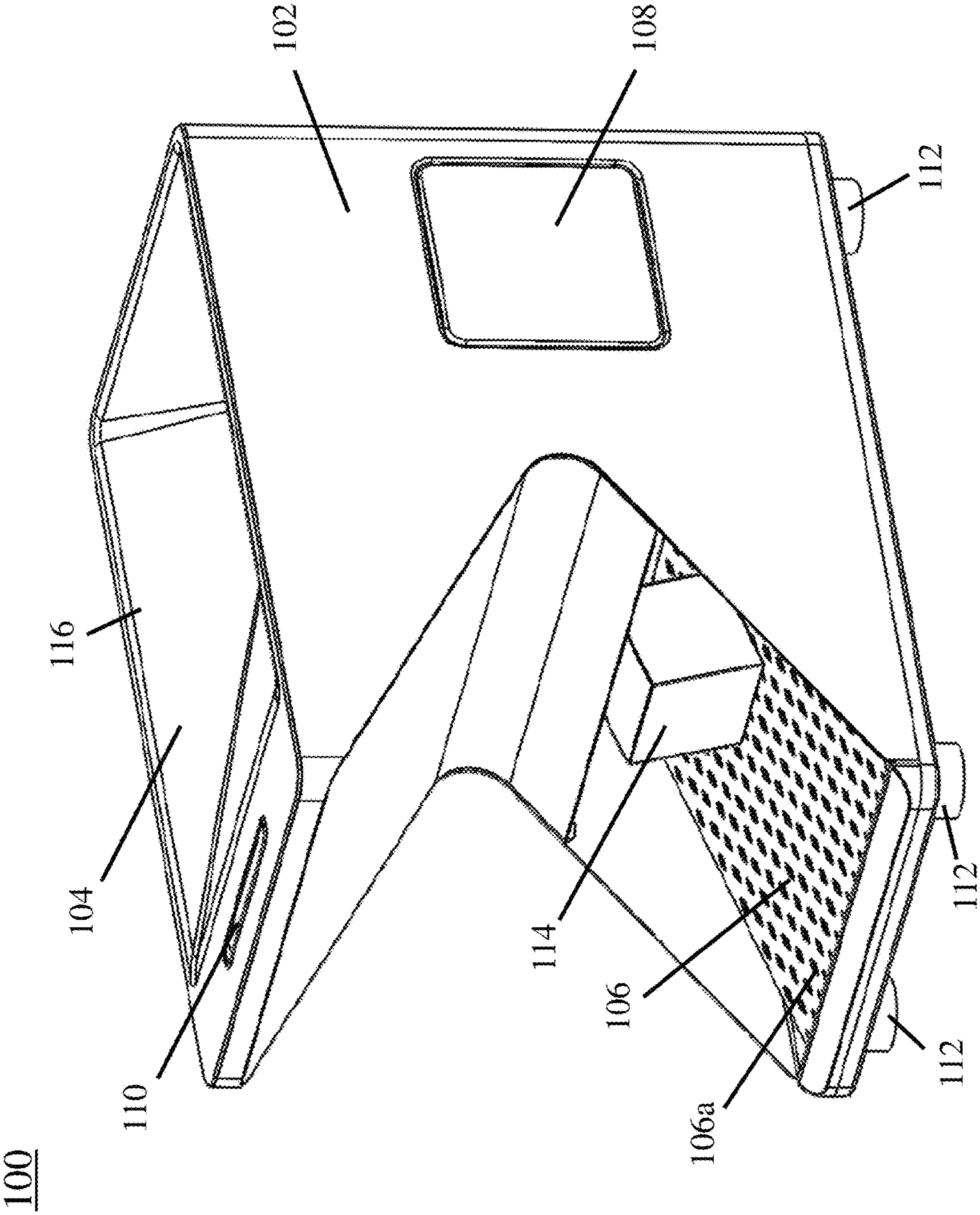
FIG. 1 illustrates an isometric view of a system for stamping ice in accordance with embodiments of the present disclosure.

Referring now to FIG. 1, an illustration of an isometric view 100 of a system for stamping ice is shown. The system may be used to stamp ice bodies (e.g., stamp ice bodies with a logo, letters, numbers, or any design). The system can include a housing 102, a dispensing area 106, a feed chute 116, a pusher mechanism, and a stamping mechanism (e.g., stamp). The system can receive one or more ice bodies 114 through the feed chute 116. For purpose of illustration and not limitation, in an exemplary embodiment the system can receive up to six ice bodies (e.g. cubes measuring approximately 2-4 inches per side) in the feed chute 116.

An ice body can be any shape of ice, including but not limited to a cube, cuboid, sphere, ovoid, or well-defined or irregular body shape. For purposes of this disclosure and the drawings, a cube 114 (e.g., 2-4" ice cube) is used as a non-limiting example. Ice may be made from any freezable compound, such as water, or one or more other compounds, or is a mixture of water and one or more other compounds. For purposes of this disclosure, ice made from water and room temperature are discussed; one skilled in the art, however, will readily appreciate the range of appropriate compounds and temperatures necessary to stamp ice.

The feed chute 116 can have an elongated body extending from the top surface of the housing 102 to the interior volume of the housing 102. The feed chute 116 can define an inlet having a first opening 104 disposed at the top surface of the system and in fluid communication with a second opening disposed at the distal end of the feed chute 116. The first opening of the feed chute 116 can be larger than the second opening of the feed chute 116. The feed chute 116 can define a guide path for the ice body 114 that directs the ice body 114 to a stamping area. For example, the feed chute 116 can be configured with a wider opening or mouth, that includes an angled downward ramp which tapers to a narrower exit, thereby restricting the dispensing to a single cube at a time to prevent ice cubes from occluding or jamming the machine's operation. Each ice cube can be advanced via gravitational force. Additionally or alternatively, the ramp can include a conveyor belt which advances the cube(s) to the stamping location (such a conveyor belt can also reverse direction to retract cube(s) if desired to clear any blockage that may occur inadvertently). Accordingly, multiple ice bodies 114 can be introduced into the feed chute 116, which allows for rapid loading of a generic ice cube for branding/stamping as described in further detail below.

The housing 102 can be formed of a rigid plastic (e.g., polypropylene, polycarbonate, polyethylene, polystyrene, polyethylene terephthalate, acrylonitrile butadiene styrene, and/or polyamide), metal(s), any other sufficiently rigid structure, or mixtures thereof to support the components described herein. The housing 102 can further include supports 112. The supports 112 can be a geometric shape (e.g., cylinder, ovoid, cuboid) or an irregular shape. In some embodiments, the supports 112 are adjustable supports and the height of the system can be varied. For example, the supports 112 or "feet" can be altered in order to pitch the apparatus to promote ice being dispensed with the rear supports 112 raised higher than the front supports 112.

The ice body 114 can be transferred from the stamping area to the dispensing area 106 after a period of time (e.g., after the ice body is stamped). In some embodiments, the duration of the stamping is about 3 seconds. In some embodiments, the total duration of the cycle (e.g., duration of stamping and ejecting to the dispensing area 106) is about 6 seconds. The dispensing area 106 can include a ramp or inclined surface such that the dispensing area 106 is at an angle relative to the stamping area, facilitating the gravitational movement of the ice body from the stamping area to the exterior of the housing 102. In this way, a user can access the stamped ice body from the dispensing area 106. The ramp or inclined surface can have a top surface, a bottom surface, and a thickness therebetween with a plurality of openings **106*a* extending through the thickness. Meltwater off of the ice body 114 can flow from the top surface of the dispensing area 106 through the openings 106*a* to a reservoir disposed beneath the dispensing area 106, which optionally can drain externally. In some embodiments, the dispensing area 106 is formed of ceramic, stone, stainless steel, glass, and/or plastic. In some embodiments, the dispensing area 106** is removable and can be cooled separately from the system (e.g., cooled in a freezer). In some embodiments, the system can include insulation (e.g., polyurethane foam, polystyrene).

The system can further include a control panel 110 for monitoring and controlling the operation of the system. The control panel 110 can include one or more indicators configured to produce a signal (e.g., visual signal and/or audio signal) when a stamp is loaded into the system. Additionally or alternatively, the one or more indicators of the control panel 110 can be configured to produce a signal when the stamp is heated to a stamping temperature (i.e., a temperature for stamping the ice body). In some embodiments, the stamping temperature is about room temperature (e.g., between 20° C. and 23° C.). In some embodiments, the stamping temperature is between greater than room temperature. In some embodiments, the stamping temperature is between 70° C. and 75° C.

The one or more indicators can include LED indicators, digital displays (e.g., LCD/LED screens), electronic buzzers, and/or an analog thermometer. For example, a red light can indicate that the system is heating, while a green light can indicate that the system has reached a desired stamping temperature. In another example, icons or text messages on an LCD/LED screen can indicate the heating status, such as "Heating", "Ready", and/or a progress bar. The progress bar can be a linear progress bar or a circular progress bar such as those that fill up as the heating process progresses. In yet another example, a sound alert can indicate that the system is heating and/or that the stamp has reached the stamping temperature. One or more indicators can display the percentage the progress bar is filled, a time remaining until the stamp reaches the stamping temperature, and/or a current temperature of the stamp. The control panel 110 can include an interactive display (e.g., touchscreen, physical buttons) featuring responsive controls to allow users to control and monitor operation of the system. In some embodiments, the interactive display can provide a means to turn the system on and off, a means for temperature control, and/or a means for starting or stopping the heating process. In some embodiments, a means for temperature control can include decreasing or increasing the stamping temperature which can depend on the material, surface area, thickness, and/or geometry of the stamp. In some embodiments, the system includes a temperature sensor configured to monitor the temperature of the stamp and a feedback system (e.g., a Proportional-integral-derivative controller) configured to adjust the heating of the heating element. The temperature sensor can be a thermocouple, a thermistor, and/or an infrared sensor. The heating of the heating element can be adjusted by varying the voltage supplied to the heating element to alter its power output. Additionally or alternatively, the current flowing through the heating element can be adjusted. The feedback system can adjust the heating of the heating element based on a comparison of real-time temperature readings from the temperature sensor to the designated stamping temperature.

Figure 2:
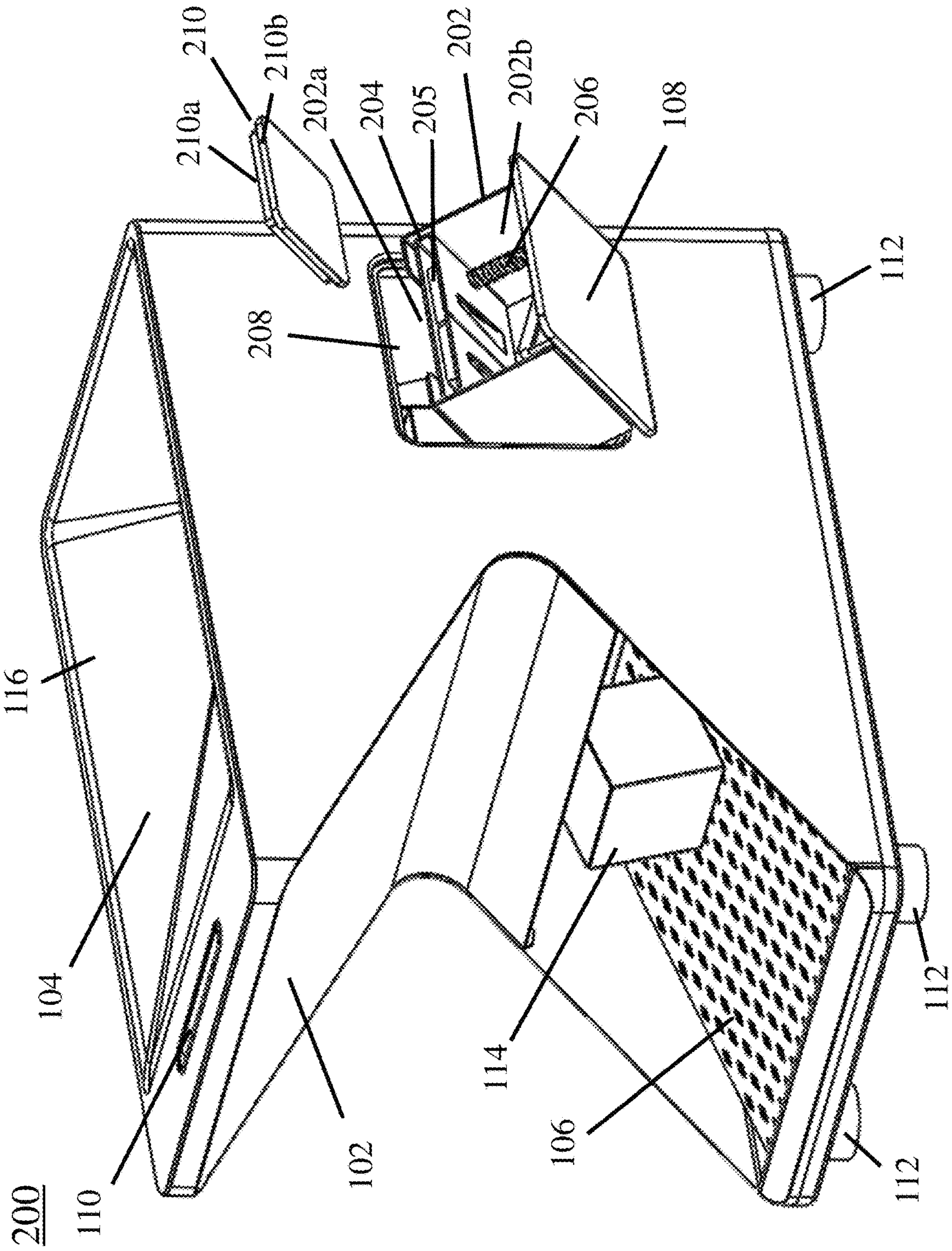
FIG. 2 illustrates an isometric view of a system for stamping ice shown in FIG. 1, in which a stamp loading door of the system is an open configuration, in accordance with embodiments of the present disclosure.

The system can include a loading door 108 coupled (e.g., hingedly coupled) to the housing. The loading door 108 can have an open configuration and a closed configuration. In the closed configuration (illustrated in FIG. 1), a surface of the door can be flush, or coplanar, with the surrounding surface of the housing 102. In some embodiments, the loading door 108 can include a handle. FIG. 2 is an illustration of an isometric view 200 of a system for stamping ice shown in FIG. 1 in which the loading door 108 is in an open configuration. In the open configuration, an opening 208 can be accessible for loading/retrieving a stamp 210 and/or a heating element 205. In some embodiments, the heating element 205 is permanently attached to the loading tray 202. The opening 208 can extend from the exterior surface of the housing 102 to the interior volume of the housing 102. A loading tray 202 can be coupled to the loading door 108. The loading tray 202 can be configured to receive and secure a heating element 205 and/or a stamp 210. The loading tray 202 can have a plurality of surfaces defining a first opening **202*a* on a side of the loading tray 202 and a second opening 202*b* on top of the loading tray 202**.

In some embodiments, the loading tray 202 is sized to receive a single stamp 210 at a time (with each stamp being manually removed before entry of a subsequent stamp). In some embodiments a plurality of stamps 210 can be loaded (or "stacked" on top of each other) to allow for quicker operation. For example, a first stamp can be used to impart a first indicia onto the ice, that first stamp then removed, and a second stamp located adjacent to the first stamp can then be automatically advanced, via spring 206 force, to advance to the stamping position wherein it can be placed in contact with a second piece of ice 114. Thus, a user does not need to load each stamp individually. Instead, a batch of stamps (e.g., 3-4, or more if the loading tray 202 is larger) can be inserted into the loading tray, with each removed after use (i.e., heating and imparting an indica onto the ice) and the subsequent stamp immediately positioned for a subsequent stamping operation.

The loading tray 202 can further include a heating element pocket 204 and a spring element 206. The first end of the spring element 206 can be coupled to a side of the loading tray 202 disposed opposite of the first opening 202*a*, while the second end of the spring element 206 can be coupled to the exterior surface of the heating element pocket 204. The spring element 206 can be a compression spring such that the spring resists axial compressive forces. In other words, the spring element 206 applies a force which pushes the heating element pocket 204 towards the first opening 202*a* and into contact with the (removable) stamp 210.

The heating element pocket 204 can have a plurality of sides forming a substantially rectangular enclosure which can hold and contact the heating element 205, e.g. with approximately equivalent surface area as the stamp 210. The heating element pocket 204 can be formed of copper, aluminum, brass, steel, and/or any metal. The heating element 205 can be a resistive heating element such as a heating mat, a strip heater, and/or a block heater, or alternatively can be any other source for transferring heat energy. The heating element 205 can be formed of nickel-chromium alloys, copper, iron, stainless steel, carbon, ceramic, and/or silicone rubber. The heating element 205 can be formed of any thermally insulating material in which a resistive wire can be embedded. The heating element 205 can be configured to maintain the stamp 210 at the stamping temperature.

The stamp 210 can be any geometric shape (e.g., rectangular, triangular, circular, polygonal) or an irregular shape. The stamp 210 can include a body (e.g., a rectangular body) with a boss feature 210*a* (i.e., a protruding section) that can be shaped in various forms, such as letters, logos, symbols, and/or any design. The portion of the body surrounding the boss feature 210*a* can define a retaining feature 210*b*, which is configured to contact the interior surface of the loading tray 202 (proximal to the first opening 202*a*) when the stamp is inserted into the loading tray 202. The boss feature 210*a* of the stamp 210 can extend through the first opening 202*a* and past the exterior surface of the loading tray 202 (to contact the ice, when present).

To insert the stamp 210, the heating element pocket 204 can be at least partially compressed, defining a gap between the heating element pocket 204 and the interior surface of the loading tray 202 (proximal to the first opening 202). Once the stamp 210 is positioned within this gap, releasing the heating element pocket 204 compresses the stamp 210 against the interior surface of the loading tray 202. In this manner, the surface of the stamp 210 disposed opposite of the boss feature 201*a* can contact the exterior surface of the heating element pocket 204, allowing heat from the heating element 205 to conduct through the thickness of both the heating element pocket 204 and the stamp 210.

In some embodiments, the stamp 210 can be a plurality of stamps arranged adjacent to each other, such as in a grid configuration. In some embodiments, the plurality of stamps can include a securing feature configured to temporarily maintain the arrangement of the stamps relative to each other. In some embodiments, the securing feature of the stamp 210 can be a magnet. For example, one or more magnets can be disposed on one or more sides of the stamp 210 that are substantially perpendicular to the boss feature 210*a*. In some embodiments, the securing feature of the stamp 210 can be a joint (e.g., tongue and groove joint, biscuit joint, dowell joint) of the stamp 210 that allows the stamps to interlock when arranged. The stamp 210 can be formed of aluminum, copper, stainless steel, and/or brass.

In some embodiments, the ice body 114 has a spherical shape. In these embodiments, the boss feature 210*a* of the stamp 210 can have a profile that conforms to the curvature of the ice body 114.

The system can include a safety feature. In some embodiments, the safety feature is configured to prevent operation of the system (e.g., heating of the stamp) when the loading door 108 is in the open configuration. In some embodiments, the safety feature is configured to lock the loading door 108 when it is in the closed configuration until the stamp and/or heating element of the system reach a handling temperature. In some embodiments, the handling temperature is about 50° C. In some embodiments, the handling temperature is between 49° C. and 60° C. In some embodiments, the handling temperature is about room temperature (e.g., between 20° C. and 23° C.).

Figure 3:
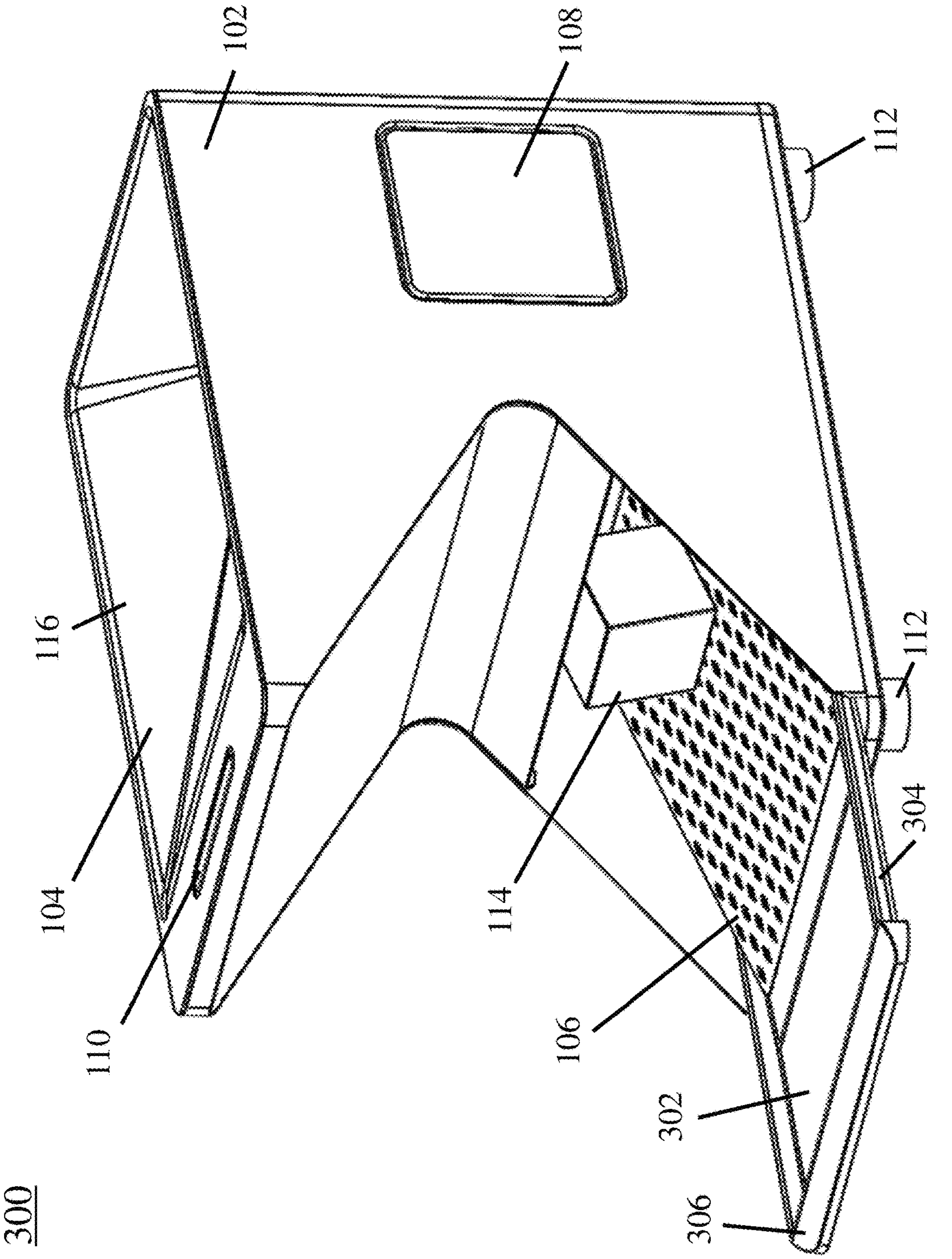
FIG. 3 illustrates an isometric view of a system for stamping ice shown in FIG. 1, in which a reservoir of the system is in an open configuration, in accordance with embodiments of the present disclosure.

Referring now to FIG. 3, an illustration of an isometric view 300 of a system for stamping ice shown in FIG. 1 having a reservoir 302 in an open configuration is shown. The reservoir 302 can be coupled (e.g., slidingly coupled) to the housing 102. The reservoir 302 can be removable and can be configured to collect melt water of an ice body 114 positioned within the stamping area and/or from one or more ice bodies 114 in the dispensing area 106. Meltwater of the ice body 114 can flow from the top surface of the dispensing area 106 through the openings 106*a* to the reservoir 302 disposed beneath the dispensing area 106. The reservoir 302 can further include a rail 304 configured to align and engage with a guided path within the housing 102, allowing for closed and open configurations of the reservoir 302. A lip 306 disposed on the reservoir 302 can be configured as a grabbable portion, allowing a user to slide the reservoir 302 in and out of the housing 102. In some embodiments, the system can be configured to produce a signal (e.g., visual signal, audible signal) when the water level in the reservoir 302 reaches a threshold level. This signal can indicate to a user when to empty the reservoir 302 to prevent overflow of the meltwater.

Figure 4:
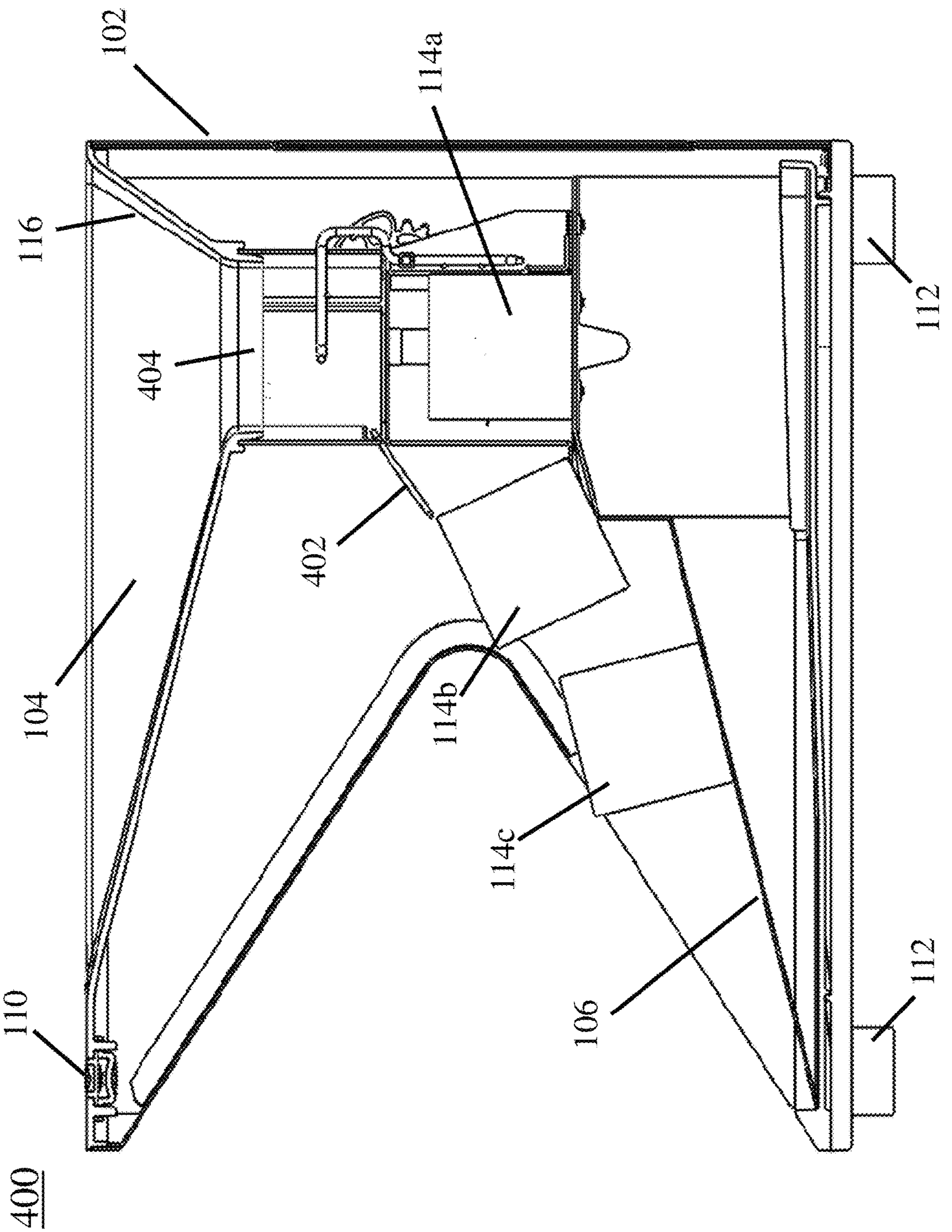
FIG. 4 illustrates a section side view of a system for stamping ice shown in FIG. 1 in accordance with embodiments of the present disclosure.

Referring now to FIG. 4, an illustration of a section side view 400 of a system for stamping ice shown in FIG. 1 is shown. Multiple ice bodies 114 can be within the housing 102 throughout operation. For example, a first ice body 114*a* can be in the stamping area, positioned beneath the second opening 404 of the feed chute 116, while a second ice body 114*b* can be between the stamping area and the dispensing area 106, and a third ice body 114*c* can be in the dispensing area 106. In some embodiments, the system includes a member 402 fixedly coupled to an interior portion of the system. The member 402 can be an inclined elongated member (e.g. pivotable flap) for guiding the ice body 114 downward and toward the dispensing area 106 when it is ejected from the stamping area.

Figure 5:
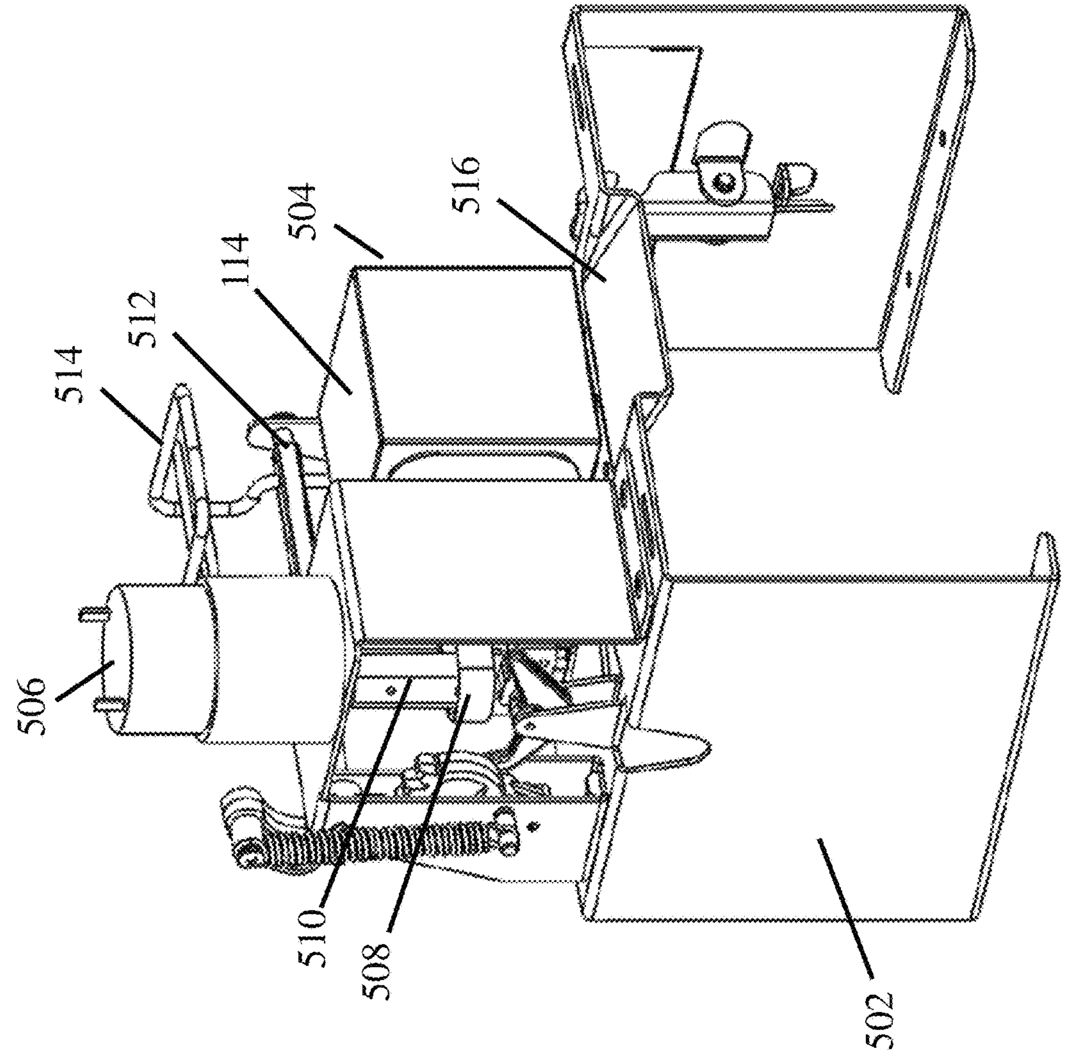
FIG. 5 illustrates a front isometric view of a pusher mechanism of a system for stamping ice in accordance with embodiments of the present disclosure.
Figure 6:
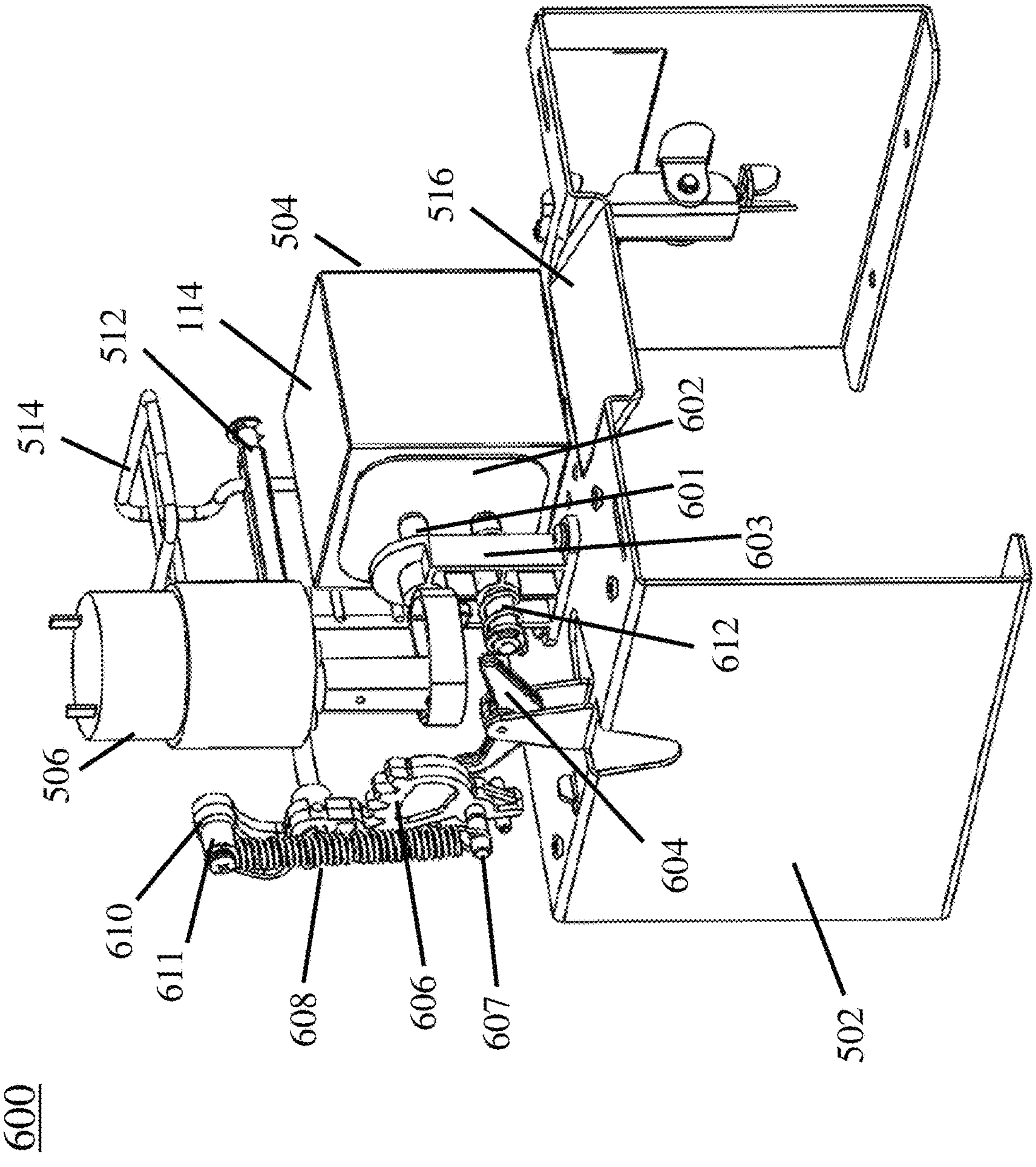
FIG. 6 illustrates a front isometric view of a pusher mechanism of a system for stamping ice shown in FIG. 5, in which a portion of the system is in hidden view, in accordance with embodiments of the present disclosure.
Figure 7:
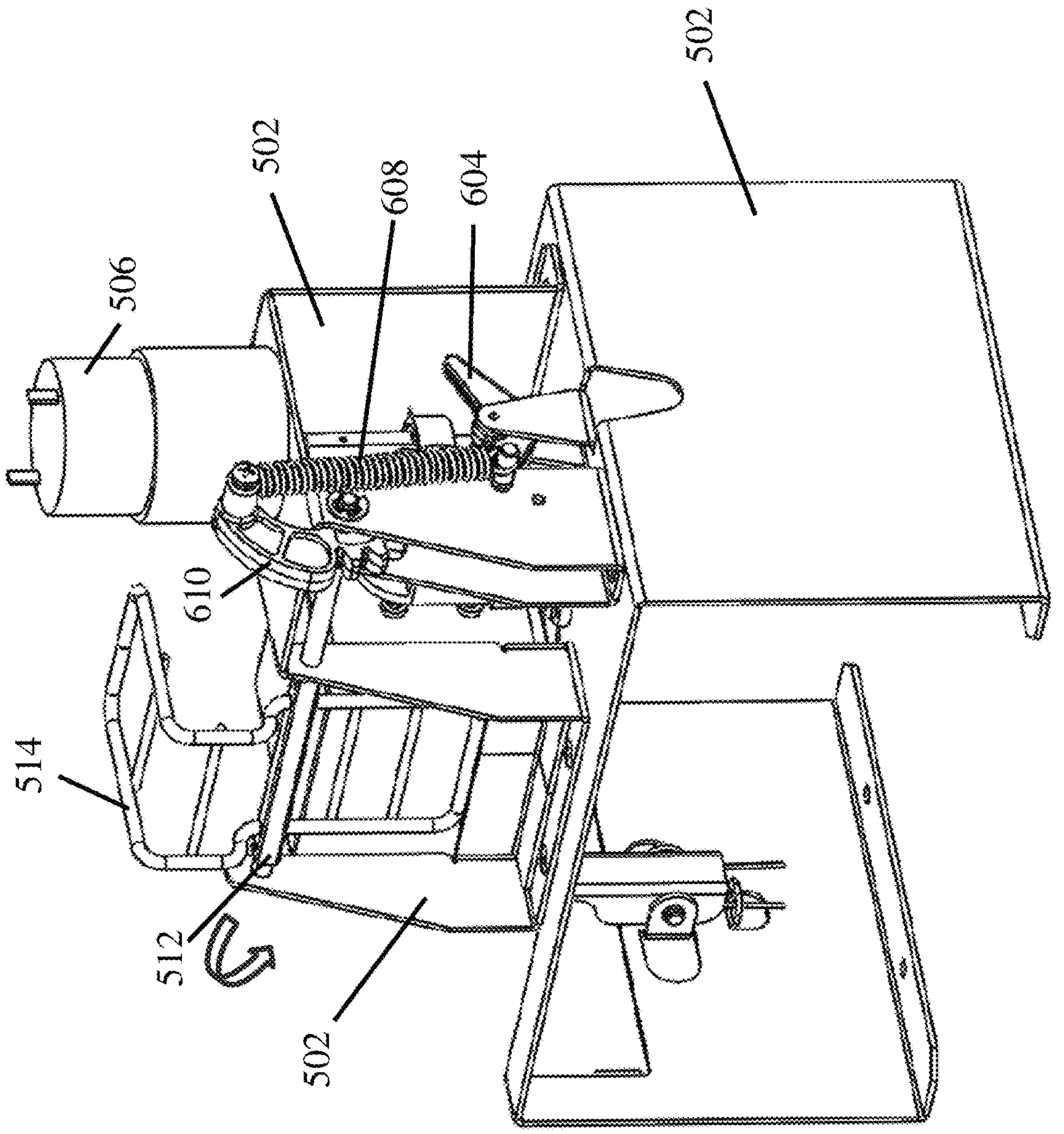
FIG. 7 illustrates a rear isometric view of a pusher mechanism of a system for stamping ice shown in FIG. 5 in accordance with embodiments of the present disclosure.

FIG. 5 is an illustration of a front isometric view 500 of a pusher mechanism of a system for stamping ice shown in FIG. 1. FIG. 6 is an illustration of a front isometric view 600 of a pusher mechanism of a system for stamping ice shown in FIG. 5, in which a portion of a chassis of the system is in hidden view. FIG. 7 is an illustration of a rear isometric view 700 of a pusher mechanism of a system for stamping ice shown in FIG. 5. Referring now to FIG. 5, with additional reference to FIG. 6 and FIG. 7, the pusher mechanism can be mounted on a chassis 502 and proximal to the stamping area 504. The chassis 502 can include a plurality of attachment points for coupling components of the pusher mechanism (e.g., actuator 506, guide member 603) to the chassis 502. The chassis 502 can be a singular component or composed of multiple components that are coupled together using one or more fastening mechanisms (e.g., welding, screws, bolts and nuts). The chassis 502 can additionally define an ejection path 516, which can be an inclined portion relative to the top surface of the chassis 502. The ejection path 516 can guide the ice body 114 to the dispensing area 106.

The pusher mechanism can be configured to push the ice body 114 against a surface of the stamp 210 (e.g., boss feature 210*a*). The pusher mechanism can include a cam shaft 510 rotatably mounted and driven by an actuator 506, a cam 508 coupled to the cam shaft 510, and a follower in contact with an exterior surface of the cam 508. In some embodiments, the actuator 506 is a motor (e.g., DC motor, stepper motor, servo motor, servo motor, AC motor, gear motor). The cam 508 can be circumscribingly fixed to one end of the cam shaft 510, while the other end of the cam shaft is coupled to the actuator 506. In this way, the cam 508 rotates about a longitudinal axis of the cam shaft 510 when the actuator 506 drives the cam shaft 510.

Figure 10:
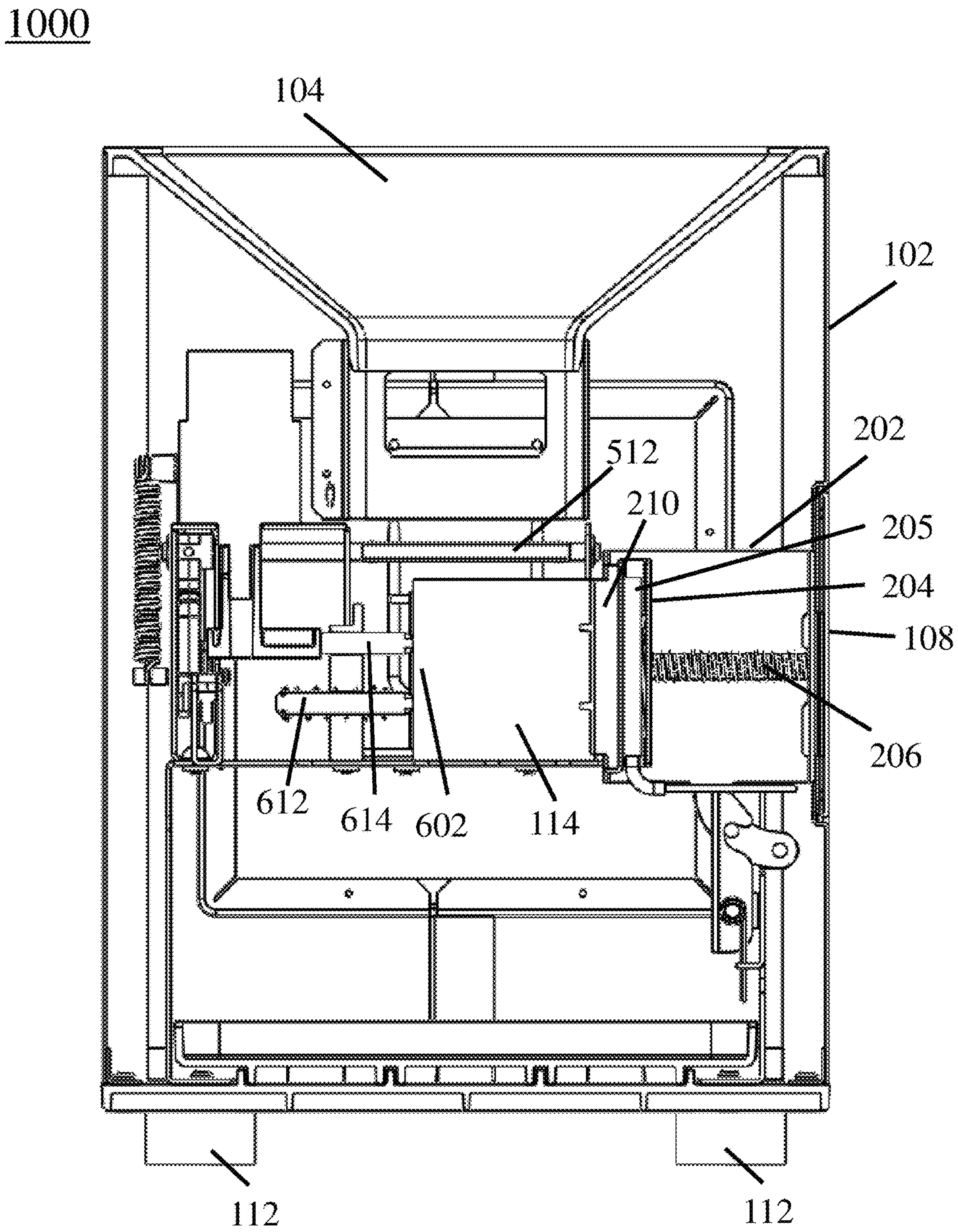
FIG. 10 illustrates a front section view of a system for stamping in accordance with embodiments of the present disclosure.

In some embodiments, the follower comprises two separate components: a first rod member 601, with its first end in contact with the exterior surface of the cam 508 and its second end coupled to a pusher plate 602. In some embodiments, the first rod member 601 and the pusher plate 602 are a single component. The pusher plate 602 can be any shape such as rectangular, circular, triangular, polygonal, or an irregular shape. The surface of the pusher plate 602 disposed opposite of the first rod member 601 can be parallel to a proximal surface of an ice body 114 in the stamping area 504. In some embodiments, the follower only includes the first rod member 601. The exterior surface of the cam 508 can be shaped and sized to define a predetermined motion profile for the follower as the actuator 506 drives the cam shaft 510, rotating the cam 508 accordingly. The follower can translate axially from a retracted position to an advanced position. In the advanced position, the follower contacts the ice body 114 and pushes the ice body 114 (laterally outward) against a surface of the stamp 210 (e.g., boss feature 210*a*). FIG. 10 is an illustration of a front section view 1000 of a system for stamping ice shown in FIG. 1, in which the follower is in the advanced position and the ice body 114 contacts a surface of the stamp 210. In the retracted position, the follower does not contact the ice body 114. The follower can include a second rod member 612 having a spring element. The spring element of the second rod member 612 can be a tension spring such that the spring resists axial stretching forces. In other words, the spring element can apply a pulling force to one end of the second rod member 612, retracting the follower back into the retracted position. The follower can be biased to return to the retracted position.

The first rod member 601 of the follower can be slidingly coupled to an opening of a guide member 603, allowing the follower to translate axially within the opening when the cam 508 rotates. The guide member 603, which may be coupled to the chassis 502 using fasteners or welding, can help maintain the alignment and stability of the first rod member 601 during its movement.

The system can further include a sensor configured to detect the ice body 114 within the stamping area 504 such that the pusher mechanism is activated to push the follower against the ice body 114 when the sensor detects the ice body 114. In some embodiments, the activation of the pusher mechanism is delayed for a period of time after sensor detection until the stamp is heated to the stamping temperature. In some embodiments, the activation of the pusher mechanism occurs immediately after sensor detection regardless of the temperature of the stamp. The sensor can be an infrared sensor, an optical sensor (e.g., photoelectric sensor), an ultrasonic sensor, a pressure sensor, and/or any sensor capable of detecting an ice body.

In some embodiments, the pusher mechanism converts rotary motion into linear motion to translate the follower axially (e.g., rotary motion of the actuator 506 to linear motion of the follower). In some embodiments, the pusher mechanism includes a rack and pinion system, which consists of a gear that travels along a linear gear track, converting rotational motion into linear motion to push the follower. In some embodiments, the pusher mechanism includes a belt-driven actuator which can use a belt and pulley system for motion. In some embodiments, the pusher mechanism includes a screw-driven linear actuator which can convert rotational motion into linear displacement through a threaded screw mechanism. In some embodiments, the pusher mechanism uses only linear motion to translate the follower axially. The actuator 506 can be a linear actuator such as a pneumatic linear actuator, which uses compressed air to create motion, or a hydraulic linear actuator, which can use a piston-cylinder configuration and hydraulic fluid to generate a force.

The follower can remain in the advanced position for a period of time (e.g. sufficient dwell time to impart the desired indicia into the ice body 114), after which it is returned to the retracted position and the ice body 114 is ejected from the stamping area 504. The system can further include an ejection mechanism configured to eject the ice body 114 from the stamping area 504. In some embodiments, the system can include an electric switch 604 configured to generate an electrical signal (e.g., digital or analog electrical signal) that actuates the ejection mechanism and/or actuates the pusher mechanism to return the follower to the retracted position. The ejection mechanism can include a drive gear 606 circumscribingly fixed to a first shaft 607, a follower gear 610 circumscribingly fixed to a second shaft 611, a spring element 608 attached to the drive gear 606 and the follower gear 610, and an ejection member 514. The first shaft 607 and second shaft 611 can be configured to rotate about their respective longitudinal axis. The longitudinal axis of the first shaft 607 and second shaft 611 can be parallel to each other. The first shaft 607 can be rotatably coupled to the chassis 502 and extend through one or more openings (e.g., through-hole) of a surface of the chassis 502.

The first end of the spring element 608 can be coupled to the first shaft 607 and the second end of the spring element 608 can be coupled to the second shaft 611. The ejection member 514 can be coupled to a third shaft 512 having a longitudinal axis parallel to those of the first shaft 607 and the second shaft 611. In some embodiments, the ejection member 514 and the third shaft 512 are a singular component. The first end of the third shaft 512 can extend through the follower gear 610 and be coupled (e.g., fixedly coupled) to the gear, while the second end of the third shaft 512 can be rotatably coupled to the interior surface of the housing 102. A portion of the third shaft 512 can extend through openings (e.g., through-hole) of the chassis 502, which can maintain the alignment and stability of the third shaft 512 during its rotation. The third shaft 512 can include a torsional spring to bias a position of the ejection member 514.

Figure 8:
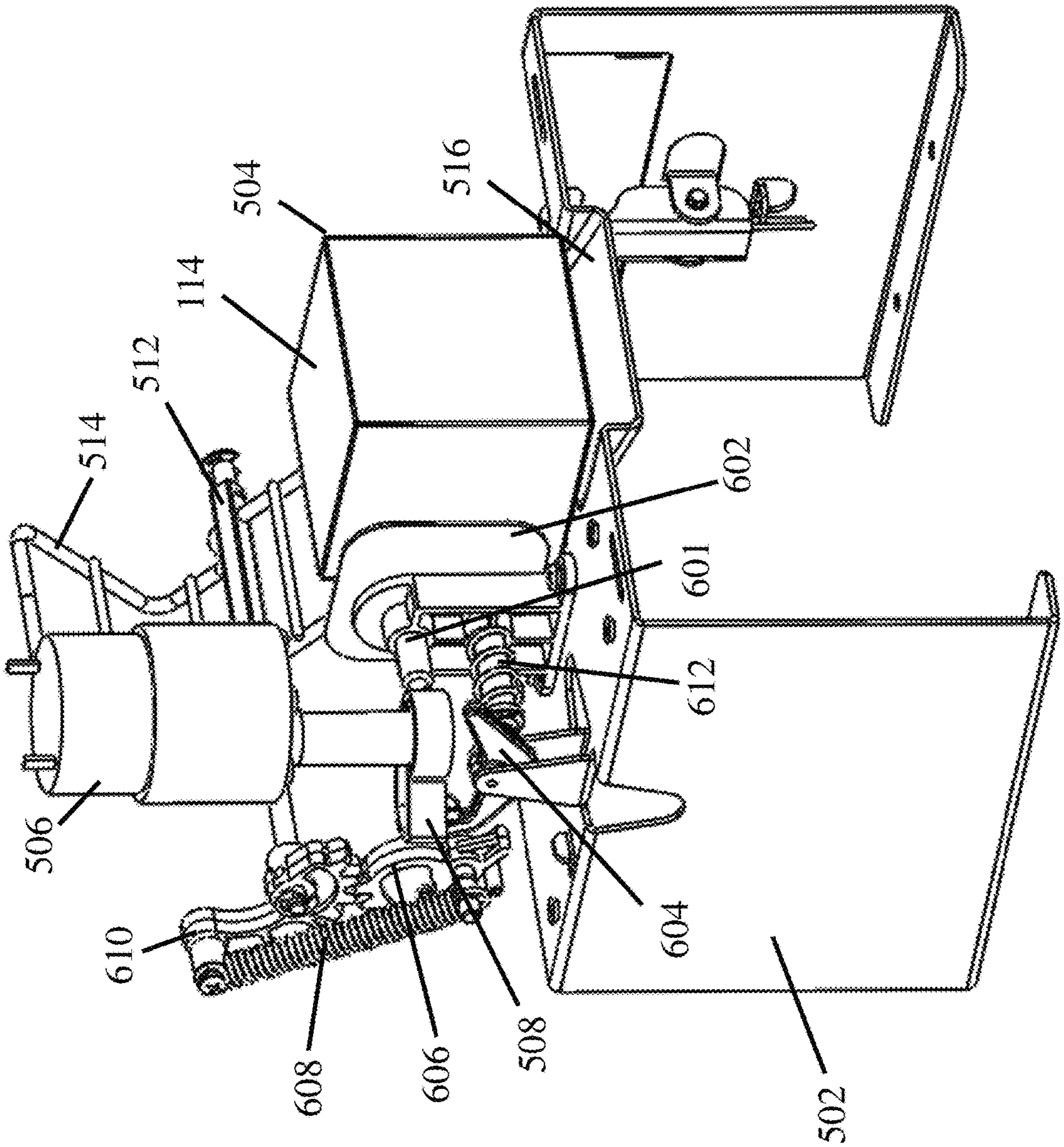
FIG. 8 illustrates a front isometric view of a pusher mechanism of a system for stamping ice shown in FIG. 6, in which an ejection member of the system is in a tilted configuration, in accordance with embodiments of the present disclosure.
Figure 9:
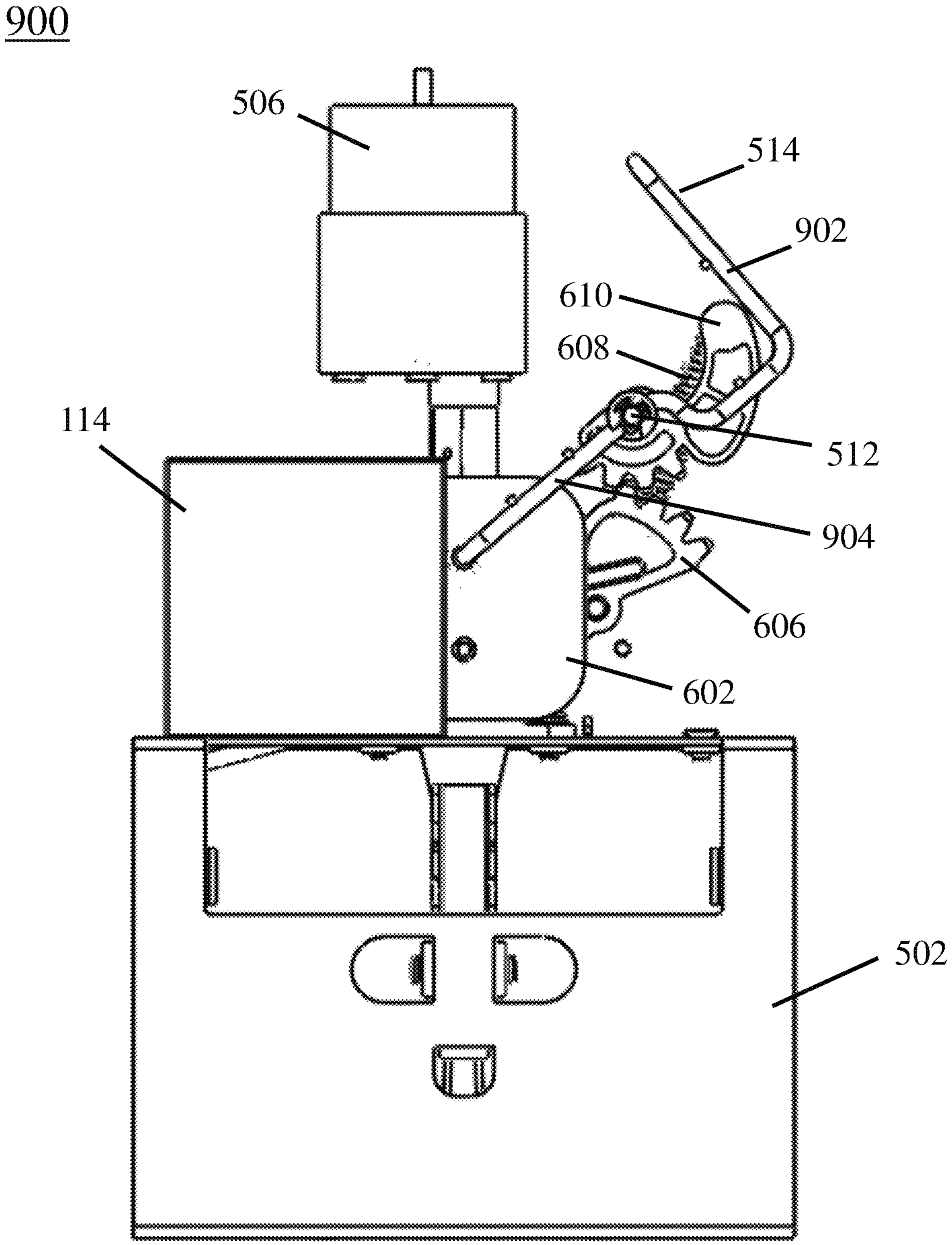
FIG. 9 illustrates of a front view of a pusher mechanism of a system for an ice stamping machine shown in FIG. 8.

FIG. 8 is an illustration of a front isometric view of a pusher mechanism of a system for stamping ice shown in FIG. 5 having an ejection member 514 in a tilted configuration. FIG. 9 illustrates of a side view of a pusher mechanism of a system for stamping ice shown in FIG. 5 having an ejection member 514 in a tilted configuration. In some embodiments, the ejection member 514 is biased in a tilted configuration. In some embodiments, the ejection member 514 is biased in a non-tilted configuration. The rotation of the drive gear 606 turns the follower gear 610, which in turn rotates the ejection member 514 about the longitudinal axis of the third shaft 512. Depending on the direction of the rotation, this movement positions the ejection member 514 in a tilted configuration for ejecting the ice body from the stamping area 504 after stamping, or in a non-tilted configuration while the ice body is being stamped in the stamping area 504.

The ejection member 514 can be a frame body having an upper end 902 and a lower end 904, e.g. such that the ejection member has a generally L-shaped structure. The lower end 904 can be substantially perpendicular to the upper end 902 such that in the non-tilted configuration, the upper end 902 at least partially blocks the second opening 404 of the feed chute 116. In this way, when a first ice body is in the stamping area 504, a second ice body entering the system (through the feed chute 116) remains above the upper end 902, preventing it from entering the stamping area 504. Thus, the structure of the ejection member 514 prevents two ice bodies 114 from attempting to enter the stamping area at the same time, thereby preventing occlusion or jamming of the apparatus.

The ejection member 514 can be formed of metal (e.g., stainless steel, aluminum, brass) and or plastic (e.g., polypropylene, polycarbonate, polyethylene, polystyrene, polyethylene terephthalate, acrylonitrile butadiene styrene, and/or polyamide). In the tilted configuration, the ejection member 514 at least partially rotates, displacing the lower end 904 towards the dispensing area 106 and the upper end 902 away from the dispensing area 106. In this way, a first ice body in the stamping area 504 is ejected from the stamping area 504 and a second ice body can enter the stamping area 504.

Figure 11A:
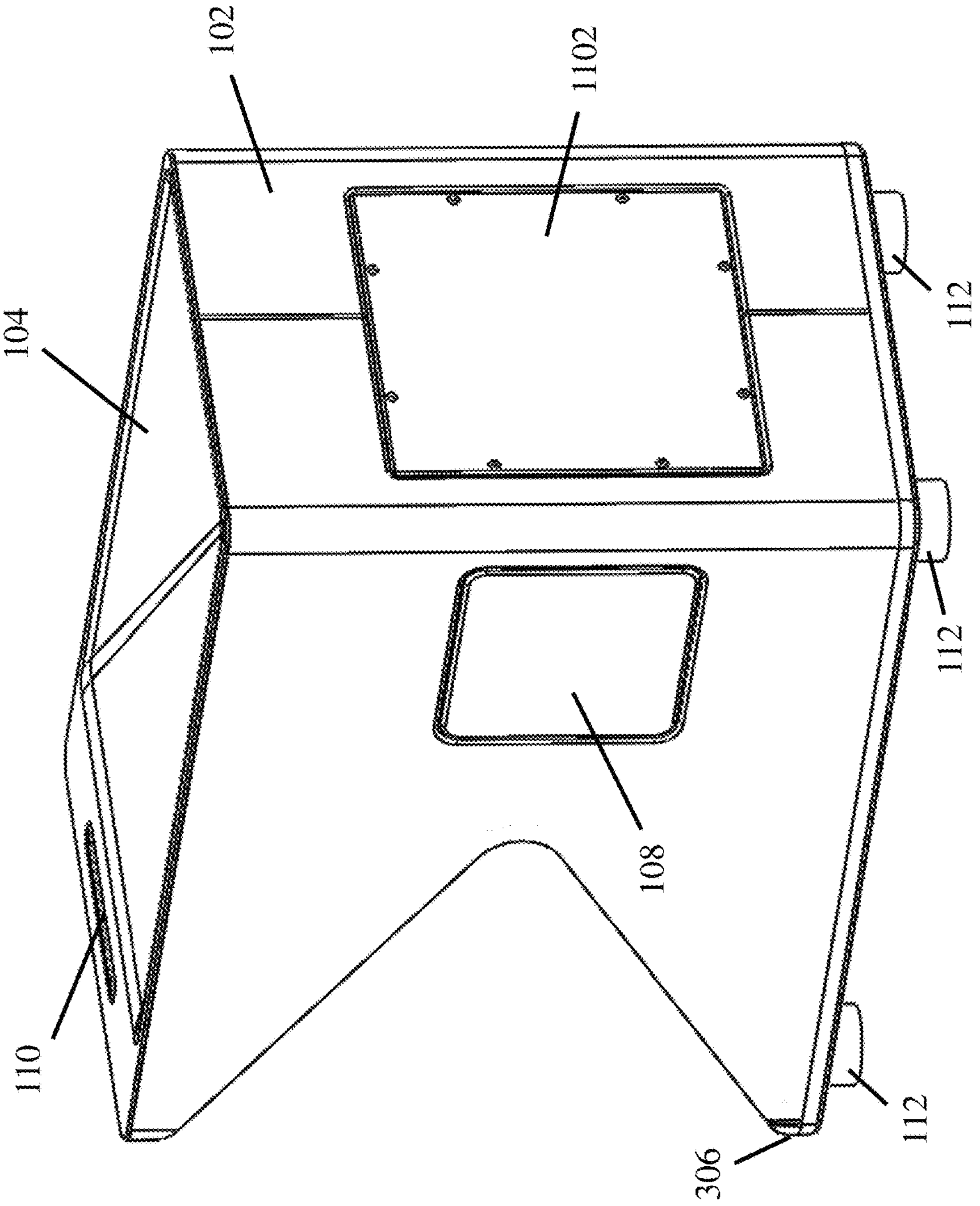
FIGS. 11A-11B illustrate rear isometric views of a system for stamping ice in accordance with embodiments of the present disclosure.
Figure 11B:
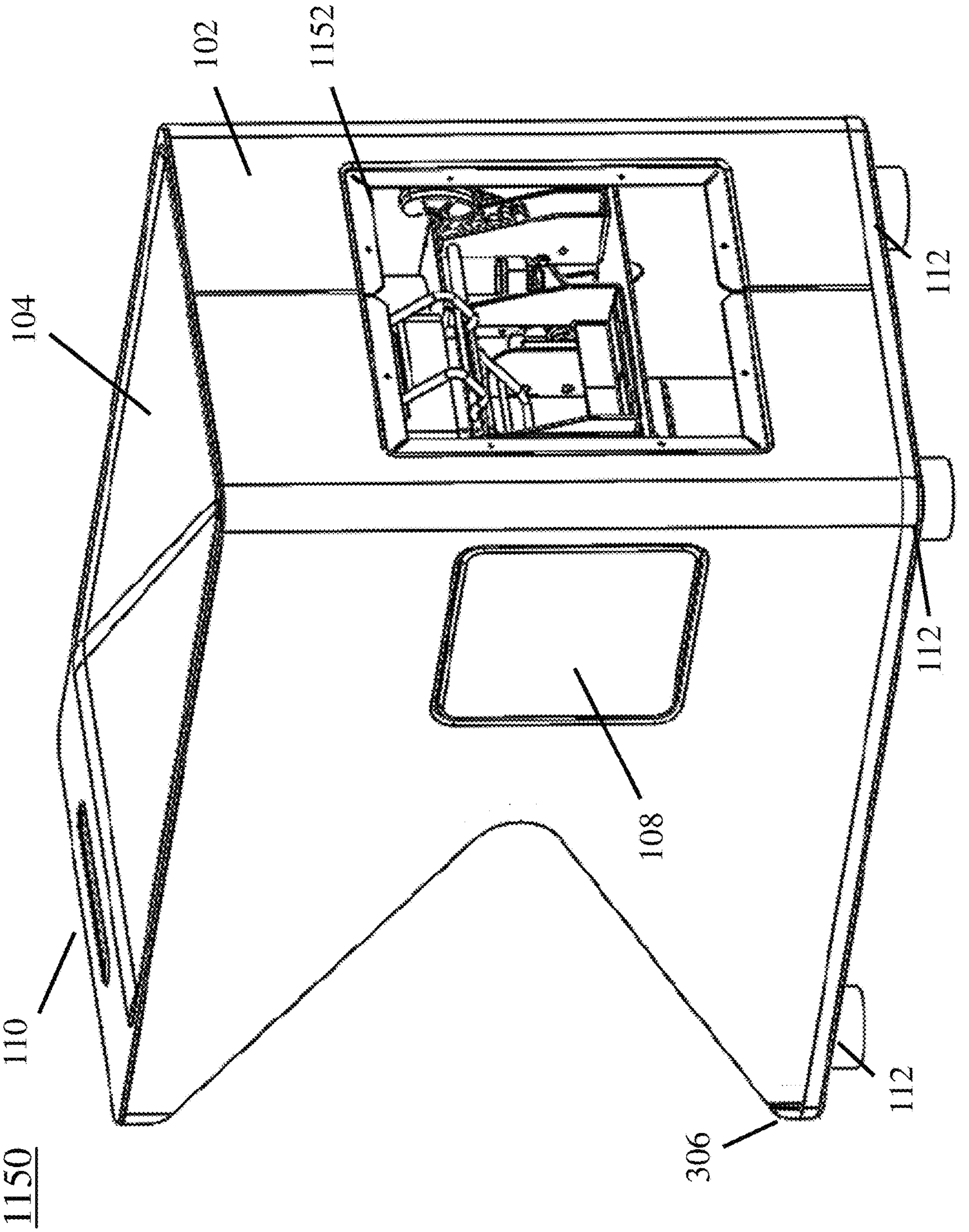

FIG. 11A is an illustration of a rear isometric view 1100 of a system for stamping ice. FIG. 11B is an illustration of a rear isometric view 1150 of a system for stamping ice shown in FIG. 11A. Referring now to FIGS. 11A-11B, the housing 102 can further include a removable access panel 1102 which can be attached to the housing 102 using fastening mechanisms (e.g., screws, bolts and nuts, adhesives, magnets, hook and loop fasteners, keyed locks, sliding latches, snap fasteners). The access panel 1102 can be any shape such as rectangular, circular, triangular, polygonal, or an irregular shape. When the access panel 1102 is removed, an opening 1152 extending from the exterior surface of the housing 102 to the interior volume of the housing 102 can be accessed, allowing access to the internal mechanisms (e.g., ejection mechanism, pusher mechanism, stamping mechanism) of the system.

In some embodiments, the stamping mechanism is a laser (e.g., $CO_2$ laser, ultraviolet laser, diode laser). A laser can be used to engrave an ice body by using a focused beam of light to create letters, logos, patterns, and/or any design on the surface of the ice body. In some embodiments, a user can create a design digitally (e.g., via an interactive display of the control panel) and transmit the design to instruct the operation of the system (e.g, movement of the laser, power of the laser).

In some embodiments, the system can include a cooling system configured to cool the system or portions of the systems (e.g., first opening 104, feed chute 116, stamping area, dispensing area 106, the loading tray 202, heating element pocket 204, heating element 205, stamping area 504, and/or stamp 210) to the handling temperature (e.g., about 32° F.) or another preselected temperature or temperatures.

In some embodiments, the stamping area 504 is a plurality of stamping areas. For example, each stamping area can have a pusher mechanism, an ejection mechanism, and stamping mechanism (e.g., stamp) disposed proximal to the stamping area such that multiple ice bodies 114 can be stamped in a sequence or at the same time. In some embodiments, a single pusher mechanism can push multiple ice bodies 114 in the stamping area against the stamping mechanism. In some embodiments, multiple ice bodies 114 can be ejected by the same ejection mechanism.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A system for stamping ice comprising:

a housing having an opening extending into an interior volume of the housing;

a stamping area within the interior volume of the housing, the stamping area configured to receive an ice body;

a loading tray coupled to the housing and configured to receive a removable stamp and a heating element, wherein the heating element is configured to ensure the stamp is at a first temperature; and a pusher mechanism within the interior volume of the housing, wherein the pusher mechanism is configured to push the ice body against a first surface of the stamp, and the pusher mechanism comprises: a cam shaft rotatably mounted and driven by an actuator; a cam coupled to the cam shaft; and a follower in contact with an exterior surface of the cam, wherein the exterior surface defines a predetermined motion profile for the follower when the actuator drives the cam shaft; wherein the follower has an advanced position such that in the advanced position the follower pushes the ice body against the first surface of the stamp.

2. The system of claim 1, wherein the pusher mechanism pushes the ice body laterally.

3. The system of claim 1, wherein the ice body is an ice cube.

4. The system of claim 1, wherein the loading tray is disposed on a side of the housing.

5. The system of claim 1, wherein the loading tray includes at least one spring coupled to the heating element, the at least one spring biasing the heating element against the removable stamp.

6. The system of claim 1, further comprising a control panel for monitoring and controlling operation of the system.

7. The system of claim 6, wherein the control panel comprises indicators configured to produce a signal when the stamp is at the first temperature.

8. The system of claim 1, further comprising a dispensing area, wherein the ice body within the stamping area is transferred to the dispensing area after a period of time.

9. The system of claim 1, further comprising an ejection mechanism configured to eject the ice body from the stamping area.

10. The system of claim 9, wherein the ejection mechanism comprises:

a drive gear circumscribingly fixed to a first shaft, the first shaft configured to rotate about a longitudinal axis of the first shaft;

a follower gear circumscribingly coupled to a second shaft, the second shaft configured to rotate about a longitudinal axis of the second shaft, wherein the follower gear is configured to mesh with the drive gear, and wherein the longitudinal axis of the first shaft is parallel to the longitudinal axis of the second shaft;

a spring element having a first end and a second end, wherein the first end is coupled to the first shaft and the second end is coupled to the second shaft; and an ejection member coupled to a third shaft having a longitudinal axis parallel with the longitudinal axis of the first shaft and the second shaft, wherein a first end of the third shaft is coupled to the follower gear such that a rotation of the follower gear rotates the ejection member about the longitudinal axis of the third shaft.

11. The system of claim 10, wherein a rotation of the drive gear responsively rotates the follower gear and the ejection member such that the ejection member rotates from a first position to a second position, wherein in the second position a portion of the ejection member applies a pushing force to the ice body in the stamping area.

12. The system of claim 1, further comprising a guide member having an opening, wherein the follower comprises a rod member, the rod member slidingly coupled to the opening of the guide member.

13. The system of claim 1, wherein the stamp comprises a body having a retaining feature configured to abut an interior surface of the loading tray such that a portion of the stamp extends beyond an exterior surface of the loading tray.

14. The system of claim 1, further comprising a spring element having a first end and a second end, wherein the first end is coupled to the loading tray and the second end is coupled to the heating element, the spring element biased to a stretched position.

15. The system of claim 1, wherein the first surface of the stamp is parallel to a surface of the ice body.

16. The system of claim 1, wherein the opening extending into an interior volume of the housing is coupled to a feed chute having an interior surface that defines a guide path for the ice body.

17. The system of claim 1, further comprising a sensor configured to detect the ice body within the stamping area, wherein the pusher mechanism is activated when the sensor detects the ice body within the stamping area.

18. The system of claim 10, wherein the ejection member is generally L-shaped.

* * * * *